(12) United States Patent
Smith

(10) Patent No.: US 7,874,513 B1
(45) Date of Patent: Jan. 25, 2011

(54) APPARATUS AND METHOD FOR VERTICAL TAKE-OFF AND LANDING AIRCRAFT

(76) Inventor: Frick A. Smith, P.O. Box 1676, Kingsland, TX (US) 78654

(*) Notice: Subject to any disclaimer, the term of this patent is extended or adjusted under 35 U.S.C. 154(b) by 202 days.

(21) Appl. No.: 11/581,321

(22) Filed: Oct. 16, 2006

Related U.S. Application Data

(60) Provisional application No. 60/727,798, filed on Oct. 18, 2005.

(51) Int. Cl.
*B64C 37/00* (2006.01)
*B64C 27/28* (2006.01)

(52) U.S. Cl. ........................ 244/12.4; 244/23 A; 244/56; 244/60

(58) Field of Classification Search ................. 244/12.3, 244/12.4, 12.5, 17.23, 17.25, 23 A, 23 D, 244/56, 66, 73 C, 60, 7 R, 7 A, 7 B, 7 C, 244/55, 54, 53 R, 62, 45 A; D12/330, 326, D12/327, 328, 329
See application file for complete search history.

(56) References Cited

U.S. PATENT DOCUMENTS

| 821,393 | A | | 5/1906 | Wright | |
|---|---|---|---|---|---|
| 1,623,613 | A | * | 4/1927 | Arndt | 244/66 |
| 1,758,498 | A | | 5/1930 | Burnelli | |
| 1,861,336 | A | * | 5/1932 | Cox | 244/7 C |
| 2,437,684 | A | | 3/1948 | Custer | |
| 2,510,959 | A | | 6/1950 | Custer | |
| 2,514,478 | A | | 7/1950 | Custer | |
| 2,702,168 | A | | 2/1955 | Platt | |
| 2,767,939 | A | | 10/1956 | Taylor | |
| 3,123,321 | A | | 3/1964 | Custer | |
| 3,291,242 | A | | 12/1966 | Tinajero | |
| 3,298,633 | A | * | 1/1967 | Dastoli et al. | 244/7 R |
| 3,335,977 | A | * | 8/1967 | Meditz | 244/12.4 |
| 3,499,620 | A | * | 3/1970 | Haberkorn et al. | 244/55 |
| 3,578,263 | A | * | 5/1971 | Gunter et al. | 244/7 A |
| 4,607,814 | A | | 8/1986 | Popov | |
| 5,115,996 | A | | 5/1992 | Moller | |
| 5,419,514 | A | * | 5/1995 | Ducan | 244/12.4 |

(Continued)

OTHER PUBLICATIONS

Gerra John L. "Making History" Go Boating Magazine, Jul. 2004 pp. 92-97 (6 pages).

(Continued)

*Primary Examiner*—Tien Dinh
*Assistant Examiner*—Richard R Green
(74) *Attorney, Agent, or Firm*—Cox Smith Matthews Incorporated

(57) ABSTRACT

A fixed wing Vertical Take-Off and Landing (VTOL) aircraft for use as a Personal Air Vehicle (PAV) or unmanned vehicle. A first double-ended drive shaft engine is mounted sideways in the front of the fuselage to serve a first pair of ducted fans mounted at the ends of the front wing. A second double-ended drive shaft engine is mounted sideways in the rear of the fuselage to serve a second pair of ducted fans mounted on the rear fuselage. The ducted fans are rotatable from a horizontal orientation to a vertical orientation to permit the aircraft to take off and land as a VTOL or conventional aircraft, and to be flown as a conventional aircraft. A parachute is provided with inflation assistance to permit rapid low altitude deployment for a controlled descent of the aircraft in an emergency.

15 Claims, 9 Drawing Sheets

U.S. PATENT DOCUMENTS

| | | | |
|---|---|---|---|
| 6,338,457 B1 | 1/2002 | Hilliard | |
| 6,547,180 B1 * | 4/2003 | Cassidy | 244/12.5 |
| 2003/0080242 A1 * | 5/2003 | Kawai | 244/12.4 |
| 2003/0085319 A1 * | 5/2003 | Wagner et al. | 244/12.3 |
| 2004/0245374 A1 * | 12/2004 | Morgan | 244/12.3 |
| 2005/0230524 A1 * | 10/2005 | Ishiba | 244/23 A |
| 2006/0016930 A1 * | 1/2006 | Pak | 244/12.4 |

OTHER PUBLICATIONS

"Axial Vector Engine Technology" http://www.axialvectorengine.com, 2005 (2 pages).
"Axial Vector Energy Corp." http//www.axialvectorenergy.com (Printed on Sep. 20, 2010) (1 page).
"Perlex Laboratories Inc." May 2008 (2 pages).
Johnson Davey G. "Very Powerful Motor: Tiny Engine Makes Mad Grunt" Apr. 2006 (1 page).
"Launchpoint Technologies" Aug. 2003, (1 page).
"Pratt & Whitney" Dec. 1997 (1 page).
"Pratt & Whitney" (Printed on Sep. 20, 2010) (1 page).
"Dyna Cam Product Specification" Jun. 2004, (1 page).
Hugh Nations "Bryan College Station Eagle" Jun. 1985 (3 pages).
Curtis Wright "Curtis Wright VZ-7 Technical Data" 1958 (1 page).
"Bell Model D2127 Technical Data" 1966 (8 pages).
"US Centennial of Flight Commision" (1 page).
"US Centennial of Flight Commision The X-22" (1 page).
"Macro Industries Inc." http://www.macroindustries.com/website/files/skyrider/sr-index.htm, Nov. 1998 (2 pages).
"Bell XV3 Helicopter" 1955 (6 pages).
"Boeing V-22 Osprey" www-boeing-com-rotorcraft-military-v22-index-2005 (5 pages).
"The Full Tilt Flying Machine" Popular Science, Mar. 2006, (2 pages).
"Trek_Aerospace" www-milleniumjet.com May 19, 2006 (2 pages).
"Solo Trek Exoskeletor Flying Vehicle" www-milleniumjet.com Oct. 2000 (1 page).
"Bell Eagle Eye" (2 pages) www-scaled.com/eagleeye/EagleEye.html 1997 (2 pages).
"Doak VZ Trans" www-aerofiles-com/doak-vtrans.jpg Aug. 2001 (1 page).
Michael Kanellos "Flying Car Ready for Takeoff" Feb. 2006 (5 pages).
"Aircraft Information: Cesna 336 & 337" www-airliners-net-aircraft-data-stats-main-id-150-09 Apr. 2008 (2 pages).
McClellan, J Mac. "Flying" Dec. 2007 (7 pages).
"Rutan Aircraft Designs" http://www.centenialofflight.gov/essay/GENERAL_AVIATION/rutan/GA15.htm (Printed on Sep. 20, 2010) (4 pages).
"Eagle Aircraft" http://www.eagleaircraft.webcentral.com Jul. 2005 (1 page).
"Spawn of Osprey" Popular Science, Aug. 2006 (1 page).
"Wheres my flying car?" Popular Science, pp. 43 Mar. 2006 (1 page).
"Welcome to the Custer Channelwing Website" http://www.custerchannelwing.com Dec. 2005 (1 page).
"Ruatn Voyager—Smithsonian National Air and Space Museum" http://www.nasm-si-edu-collections.artifact.cfm?id=A19880548000 (Printed on Sep. 20, 2010) (2 pages).

* cited by examiner

DUCT POSITION – FORWARD FLIGHT WITH FORWARD THRUST

DUCT POSITION – VERTICAL LIFT AND HOVER

DUCT POSITION – BRAKING POSITION WITH REVERSE THRUST

APPARATUS AND METHOD FOR VERTICAL TAKE-OFF AND LANDING AIRCRAFT

RELATED APPLICATIONS

This application is related to U.S. Provisional application No. 60/727,798 filed Oct. 18, 2005, and claims the benefit of that filing date.

FIELD OF THE INVENTION

This invention relates generally to Vertical Take-Off and Landing (VTOL) aircraft and more specifically to a compact VTOL aircraft with a fixed wing which can be utilized as a Personal Air Vehicle (PAV) or an Unmanned Aerial Vehicle (UAV). The aircraft employs a unique placement of double-ended driveshaft engines mounted sideways with respect to the fuselage, with each engine propelling two outside mounted tilt ducted fans to allow the craft to take off, land and fly as either a conventional airplane or as a VTOL aircraft.

BACKGROUND OF THE INVENTION

Inventors have long contemplated and attempted to design vehicles which would serve as a combination car/airplane. That creation could be driven as a car to an airport where it would be converted with wings and then flown like an airplane. Upon landing, the aircraft would be converted back to a car and then driven on a roadway to a destination. The Aerocar (1959) by Molt Taylor and the recent "Transition" flying car by Massachusetts Institute of Technology graduate student Carl Dietrich and the MIT team show a continuation of that dream.

The present invention is a vehicle that contemplates no need for driving a car through traffic to and from airports. The capabilities and properties of this particular aircraft make it compact and versatile enough so as to enable a pilot to fly this invention from "door to door" without the requirement of an airport or highways. For example, a person could lift off as with a helicopter from a space such as a driveway, back yard, parking garage, rooftop, helipad, or airport and then fly rather than drive to all the day's various appointments. An object of the present invention is to provide a versatile VTOL aircraft that is not only lightweight and powerful enough to take-off and land vertically, but is also economical and powerful enough to take-off, land and fly at a fast rate of speed like an airplane. Therefore, it serves as a personal air vehicle (PAV) with a multitude of uses and configurations. The ability to transition from vertical flight to forward flight and back again provides unlimited possibilities because it combines the flexibility and best attributes of both types of aircraft.

SUMMARY OF THE INVENTION

In one embodiment, the current invention is able to achieve its power from the placement and production of two (2) Axial Vector/Dyna-Cam type engines mounted sideways with respect to the fuselage of the aircraft. These engines are lightweight and produce greater horsepower and three (3) times more torque per horsepower than conventional engines. Each engine has a double-ended driveshaft which provides direct drive to the ducted fans/nacelles which are located outside of the fuselage. Each end of each engine will turn one ducted fan, so two engines will power two (2) pairs of ducted fans for a total four ducted fans.

Forward Engine

A first engine is placed in the front section of the aircraft fuselage and the driveshafts from the ends will run through the front Canard wing on the craft to the front pair of ducted fans located at the end of said wing. These front ducts are mounted far enough out from the fuselage to prevent propeller wash in the rear ducts.

Rear Engine

The second engine is mounted behind the passenger cabin and toward the rear of the fuselage. This engine will power the aft pair of ducted fans which are attached to the fuselage, so these driveshafts connect immediately through the transfer case and the differentials into the ducts. The rear engine is slightly elevated above the center line of the side of the fuselage.

In-Line Configuration

The two sideways mounted engines are placed in-line so the passenger cabin and the rear engine receive less wind resistance, thus reducing drag on the airplane and increasing fuel efficiency. As early as 1937, Dr. Claude Dornier used the in-line configuration in his German built Dornier D0335. By the 1960s, the Cessna Skymaster 336 was using in-line engines and presently, the Adams A500 designed by Burt Rutan is utilizing the configuration.

Since the engines are located inside the fuselage rather than outside in the ducts or at the end of a main wing as on the Bell Boeing V-22 Osprey, a better in-line center of gravity is established thereby resulting in quicker response, better balance and increased stability in flight and/or in hover.

Ducted Fans

In one embodiment, the aircraft has a fixed wing and four aerodynamically designed tilt ducted fans. As early as the 1960s, the Bell X-22A was one of the first aircraft to fly using tilt ducted fans. More recently, Moller's "Skycar" (U.S. Pat. No. 5,115,996) is a vehicle which includes ducted fans with directional vanes and two engines in each duct for a total of eight engines. Unlike the X-22 with its four engines and Moeller's car with its eight engines, this invention uses only two sideways placed engines with direct drive into the ducts to power its four ducted fans.

The fact that only a differential rather than a motor is located in the ducted fan of this invention creates a larger volume of airflow through the ducts. Eliminating the weight of the motors or engines also reduces the weight on the side of the fuselage and/or the wing tips thereby using less horsepower and torque and in turn making the aircraft more responsive and stable.

Most ducts have a problem when reaching higher speeds because of a tendency to push air out in front of the duct. In one embodiment of the current invention, the aerodynamic shape of the front of the ducts is such that the bottom of each duct protrudes forward and the top of each duct slopes down to the bottom. This lifting air intake duct design creates low pressure in the bottom front of the duct which helps eliminate the need for more wing area and in turn reduces the weight of the aircraft. Willard Custer illustrated this lift principle with his Channelwing aircraft in the late 1930s. This technology is being researched even today at the Georgia Institute of Technology.

Another result of extending the bottom of the ducts is a reduction of the noise created by the turning blades. In a UAV stealth design, this will also help cover the radar signature from the turning blades.

Ducted fans permit the aircraft to take-off and land in either conventional or VTOL mode. Since the fan blades are encased in ducts, the ducts can be rotated to align horizontally with the fuselage, and the craft may take off and land conventionally. If propellers were used instead, they would need to be so large for enough thrust that they would not clear the ground. If a single row of fan blades only was utilized in the ducts, the diameter of the ducts would need to be so large to accommodate the length of blades for thrust that the ducts would not clear the ground. The current invention includes a double row of counter-rotating fan blades which provide sufficient thrust so that the duct diameter is small enough for ground clearance. Conventional take-off and landing is also provided because the double row of counter-rotating blades in the ducts allow the ducts to be small enough to clear the ground when oriented horizontally. VTOL is possible because the ducts rotate to a vertical orientation and provide sufficient thrust for take-off and landing.

Lifting Body Airframe

The aircraft body itself is an aerodynamically designed lifting body. As far back as the 1920s, Burnelli Aircraft was building a lifting body airframe (U.S. Pat. No. 1,758,498). Today, the Space Shuttle still utilizes that technology. With the engines mounted sideways with respect to the fuselage in the present invention, this design adapts itself to a lifting body application.

Emergency Parachute

One embodiment of the current invention includes a power boosted emergency parachute assembly which can be used in hover or flight position should the aircraft lose one or both of its engines, thus allowing the pilot to continue to maneuver the aircraft to a safe landing.

Fly-by-Wire Control System

One embodiment of the current invention incorporates a computer controlled fly-by-wire system which calculates gyroscopic stability and sends information to four ducted fans or blades to adjust them to the correct pitch for controlled level flight.

Fixed Wing with Removable Sections

In one embodiment, the invention has a fixed dihedral wing to provide for forward flight in airplane mode. Sections of the aircraft wings may be bolted-on or removed to create various wing lengths for different applications such as for short distances as in a city setting or long distances for long range travel and for easy transporting of the aircraft, as on a trailer or truck or in a shipping container. For example, extensions on the main wing would enable an aircraft to fly at high altitude and/or to loiter for long periods of time.

By combining the attributes of a fixed wing airplane and a helicopter to a lightweight and compact aircraft, a personal air vehicle could become a new mode of transportation. The embodiments set forth herein are merely examples of various configurations of the aircraft, and many new models can result from this invention. Different embodiments of this aircraft could range from a variety and number of passenger seating arrangements to a model with no passengers; i.e., a UAV. In other applications, the aircraft may serve as a personal air vehicle, an air taxi, an observation aircraft, an emergency rescue vehicle, a military vehicle or a UAV, or for other purposes.

ADVANTAGES OF THE INVENTION

The invention is constructed of lightweight material and the airframe is designed as a lifting body which helps reduce the weight and the square footage area of the wings.

The invention has the vertical take-off, landing and flight capabilities of a helicopter and the conventional take off, landing and flight capabilities of an airplane. It can transition back and forth between VTOL and forward flight. If the aircraft is in hover position, the air deflectors (which are mounted on the rear of each duct) enable the craft to move sideways and to counter rotate, and the tilted ducts enable it to move forward and backward safely in tight spaces. Since the aircraft uses significant power to accommodate its VTOL capabilities, it is also designed to take advantage of this power and transform it into maximum airspeed in forward flight.

All these capabilities make this a truly unique aircraft capable of a multitude of uses. Aircraft of the current invention can lift off and set down like a helicopter, but can utilize the speed of an airplane to provide quick "door to door" for convenience and for the saving of time and fuel.

Since the aircraft can take off like an airplane, it is capable of handling more weight-such as that of passengers, fuel and freight—on take off and then travel a longer distance. The aircraft can land in a conventional mode on a runway if desired, or if enough fuel is burned during a trip, the aircraft can then land vertically in a smaller space or without a runway. The compact nature of the craft, combined with the use of ducted fans, provides a large spectrum of landing locations for it as a VTOL vehicle.

Although the aircraft is not as fast as the new light jets currently being developed and soon to be offered for air taxi service, it nonetheless saves overall time because it can take off and land in locations other than a landing strip. Time commuting to and from an airport can be significant, and this aircraft provides a means to bypass airports by leaving from and returning to a nearby convenient location.

One advantage of the fixed wing aircraft is the ability to throttle back the engines and use lift from the wing to help the engines conserve fuel while flying. Either engine can be shut off, and the craft can cruise on one engine for improved fuel economy. For example, Burt Rutan's Voyager took off using both engines, then shut down one engine and flew around the world-using one engine—without refueling. Additionally, the wing is dihedral which improves the stability of the aircraft.

If one engine is lost, the aircraft can fly on either of its engines and continue to an airport to land conventionally. If both engines are lost while in flight, the aircraft's glide slope is excellent. The pilot can glide the aircraft to a landing site or use the guidable emergency parachute to float to a safe location.

Another advantage derives from the fact that the engines are not in the ducts but are instead mounted in the fuselage providing an in-line center of gravity for better stability and increased response (as opposed to having the weight on the wingtips). Additionally, the front engine breaks the air for both the cabin and the rear engine, thus creating a very aerodynamic lifting body aircraft.

The elevation of the rear engine allows for air intake scoops to be mounted on the front of each side of the engine, thereby providing for air cooling of the rear engine while still maintaining the craft's aerodynamic design. In conventional airplane mode, this elevation also improves the flare of the aircraft upon landing and derotation and allows the rear landing gears to hit the runway first. It also improves take off and rotation because the front landing gear of aircraft lifts off first.

Another advantage in landing this invention is that in the case of an engine being lost, the two ducts attached to that engine stop also. Consequently the critical engine problem which causes yaw and then roll, usually experienced when a twin engine aircraft loses an engine, is eliminated. Additionally, if an engine is lost, the aircraft is capable of auto feathering the two ducted fan blades, thereby reducing drag through the duct.

The sideways placement of the engines provides the ability to power two ducts with one double-ended drive shaft engine; therefore, the cost of construction and operation of the aircraft is less, for example, because only two engines are required to power a four ducted craft.

In one embodiment, the rear engine drive shafts are shortened going into rear ducts because they are mounted on the side of the fuselage, and the front engine drive shafts are shortened going through the Canard wing which is not as long as a main wing. This not only reduces the weight of the driveshaft, but it also provides a safety factor. Since the driveshaft enters the middle of the differential, it naturally turns two output shafts in a counter rotating motion. This reliable yet simple design also adds to the safety of the aircraft.

In one embodiment, the aircraft will use an Axial Vector/Dyna-Cam type engine which provides many advantages including very smooth operation with little vibration, utilization of a variety of fuels and high fuel efficiency. It is a lightweight, small and compact internal combustion engine with high horsepower and high torque. A high torque engine allows a high angle of attack on variable pitch blades providing quick response with little reduction in the rpm of the engine.

The ducts are aerodynamically designed to create lift thereby reducing the weight of the aircraft because of less square footage of wing area. Since no engines are located in the ducts, more area is available for airflow through the duct thus creating more lift and thrust. The front pair of ducts are mounted far enough out on the Canard wing to allow the rear ducts to receive undisturbed air.

In one embodiment, the two rows of blades turn in a counter rotating motion thereby creating more thrust and reducing the overall diameter of the ducts. This reduced diameter provides clearance for conventional aircraft take-off and landing mode as well as VTOL and VSTOL capability.

Tilt ducted fans provide the ability to get full thrust on lift and forward flight. The aerodynamic shape of the lifting duct provides for more lift with less weight since a longer wing is not needed.

The blades in each row have variable pitch. The angle of the blades is determined by computer controlled fly-by-wire and gyros thus controlling pitch for stability in hover or adjusting pitch while in forward flight. The blades have the capability of self feathering and lining up in an identical configuration behind one another within each duct to help reduce drag and increase air flow through the ducts should an engine be lost or shut down. This will extend the range which can be flown with one engine.

The use of ducted fans instead of propellers provides for safer VTOL. No exposed propellers are required, so the aircraft can land in tight spaces or get close to people or to stationary objects. For example, it could hover next to buildings for rescues, land in fields with electrical wires, and/or land in neighborhoods or a regular parking lot.

Since ducts surround the blades, the ducted fans are quieter enabling the aircraft to take off and land without the noise problem associated with helicopters. This factor could also help cover the radar signature from the turning blades in a UAV stealth design.

NASA has been researching and developing its "highway in the sky" which provides synthetic vision and GPS guidance in aircraft so that pilots can bypass the large congested airport hubs and land at smaller airports. Including this technology in this invention would allow pilots to bypass even the small airports and land near their actual destinations, and it would assist in handling bad weather such as fog.

This invention includes an emergency parachute system which provides for quick deployment and rapid expansion to prevent significant altitude loss while in hover or for a delayed deployment while in forward flight. Most of the currently used emergency parachutes—often referred to as whole-airplane recovery parachute systems—require too much time to fill with air, resulting in a significant loss of altitude before the parachute can take effect.

The Ballistic Recovery System (BRS) which was invented and patented by Boris Popov (U.S. Pat. No. 4,607,814) was originally created for ultralights and experimental aircraft and later retrofitted for larger aircraft. The BRS system is currently utilized by Cirrus Design for its lighter single engine airplanes. However, the emergency parachute system in the Cirrus aircraft allows a significant loss of altitude before the canopy is filled with air. Once the Cirrus is descending under the parachute, the pilot has no control of the descent and therefore no control of the landing site. The rocketed system in the present invention would deploy and expand the parachute in a few seconds and then allow the pilot to steer the parachute to get the aircraft to a preferred landing site.

DETAILED DESCRIPTION OF EMBODIMENT

VTOL Aircraft with Sideways Mounted Engines

Figure 1:
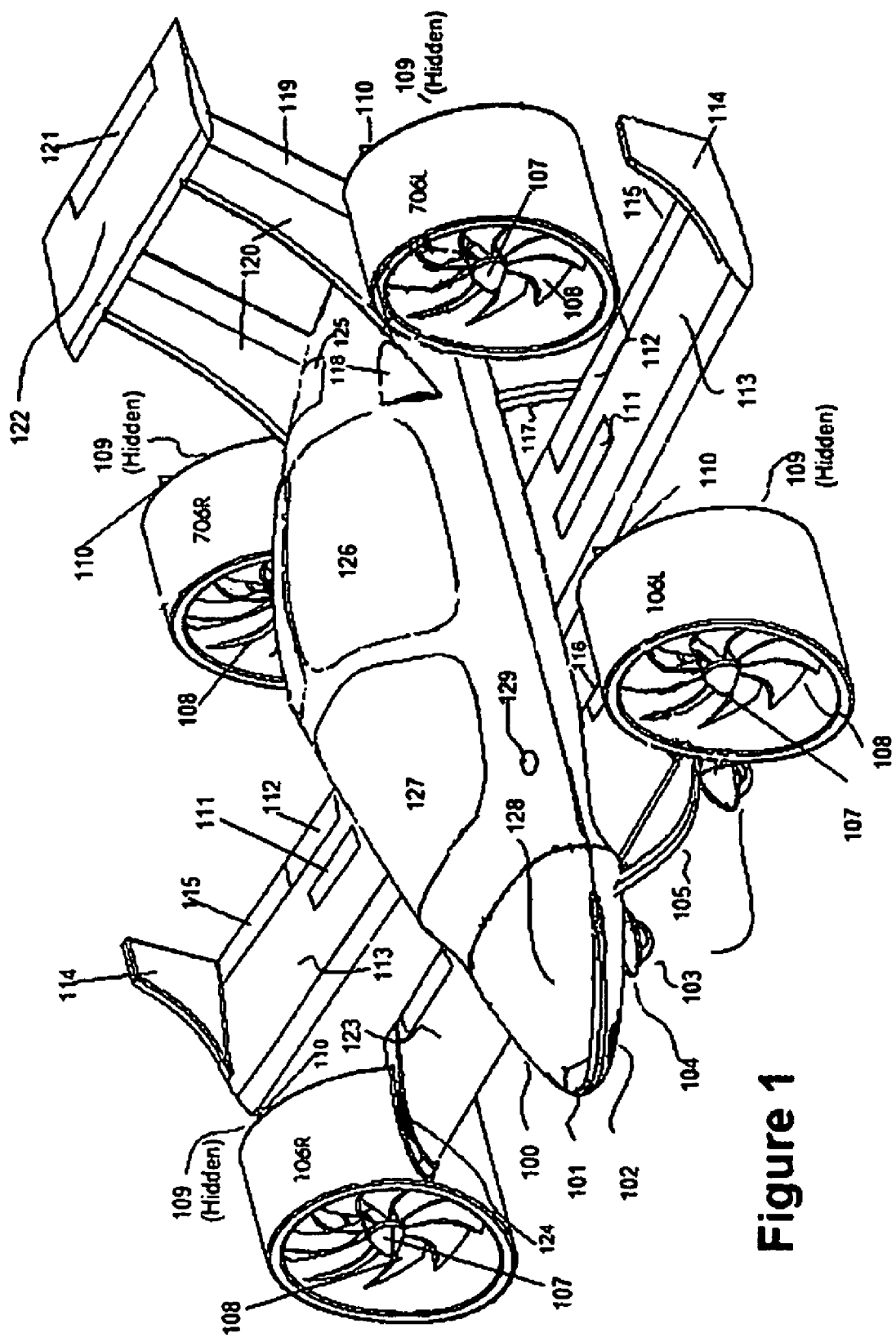
FIG. 1 is a front perspective view of a four ducted fan aircraft embodiment of the current invention.
Figure 2A:
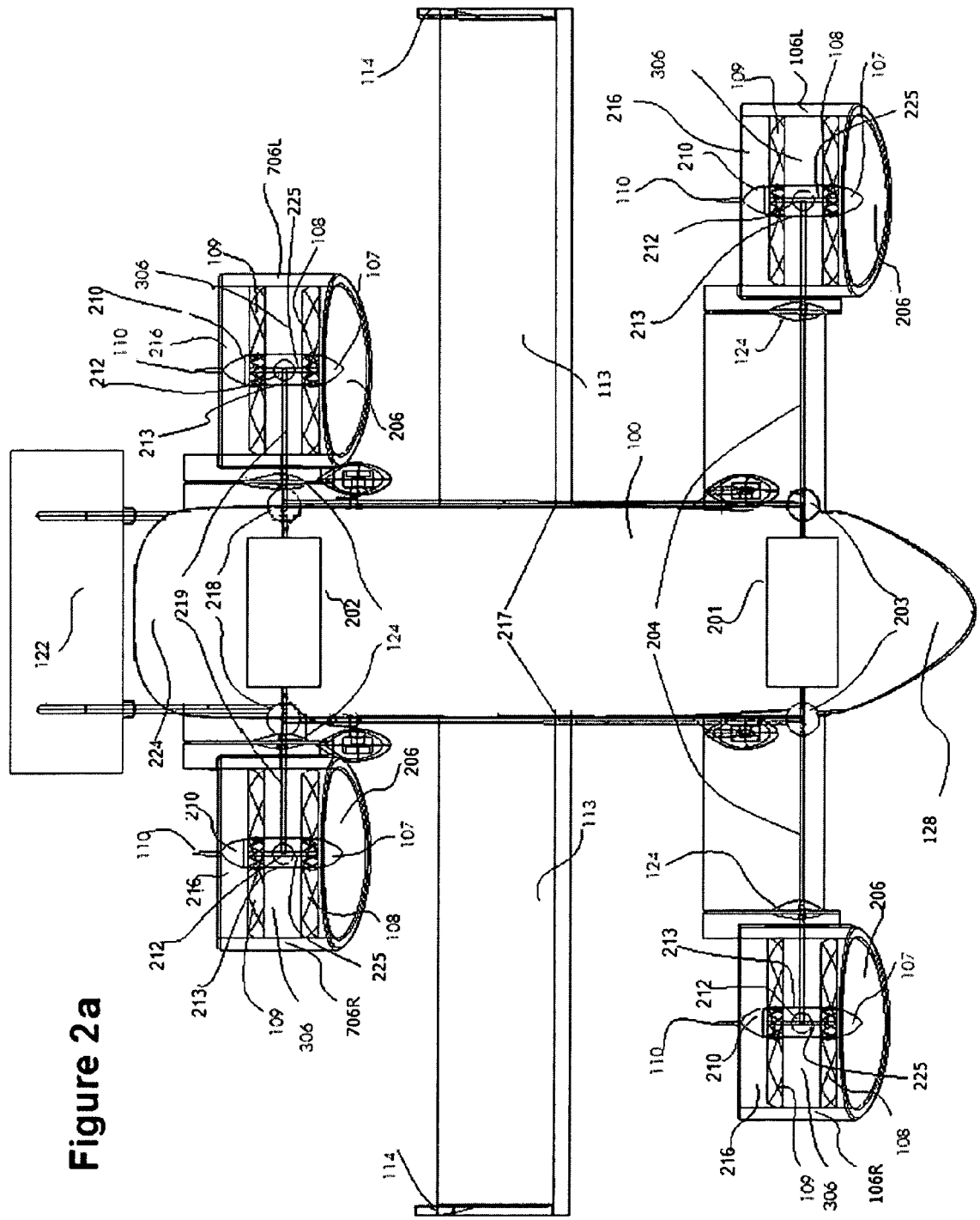
FIG. 2a is a top view of a cross section view of the aircraft of FIG. 1 showing single engines serving the front and rear pairs of ducted fans.

FIG. 1 is a front perspective view of a four ducted fan aircraft embodiment of the current invention. FIG. 2a is a top view of a cross section view of the aircraft of FIG. 1. This example is a VTOL aircraft with two (2) Axial Vector/Dyna-Cam type engines-one fore 201 and one aft 202 placed sideways with respect to an elongated lifting body fuselage 100 made of lightweight composite materials and with: a Canard wing 123 on the front, a dihedral fixed wing 113 in the middle of the fuselage 100 with winglets 114 attached on each end of the fixed wing, two vertical stabilizers 120 on the rear, a horizontal stabilizer 122 across the top of the tail, a pair of ducted fans 106R and 106L fore, and a pair of ducted fans 706R and 706L aft on each side of the fuselage 100 for a total of four (4) ducted fans. In this example, all four ducted fans have the same design, and are referred to as element 106 in the discussion of this embodiment.

The Axial Vector engine from Axial Vector Engine Corporation is a six piston twelve cylinder radial design with high horsepower and torque. The engine is small, lightweight and produces three times the torque per horsepower improving the power-to-weight ratio. It is fuel efficient & can use a variety of fuels. It has fewer parts and produces less vibration than standard engines.

Passenger Cabin

In this example, the passenger cabin is covered by a lightweight composite frame with one stationary front wraparound transparent canopy 127 which serves as the windshield, and two pivotally hinged gull wing style doors 126 which are wraparound composite door frames with transparent window material encompassing most of the surface to serve as the side windows and skylights on each side of the fuselage 100. To clarify, these doors, when closed, will serve as skylights on the top and windows on the side. The pilot and front passenger side of the cabin has oval shaped transparent material in the floorboard which will provide for downward viewing, with the pilot side floorboard window also serving as an emergency escape hatch. The side door 126 pivots wide open to allow for loading/unloading of large loads; e.g., an emergency stretcher or large cargo. It opens large enough to accommodate the ingress and egress of both the front and rear passengers. The present invention contemplates a four place cockpit; but other embodiments could include fewer or more seats or the invention could be utilized as an unmanned aerial vehicle (UAV).

Forward Section of the Aircraft

The headlights/landing lights encasement 101 is a streamlined transparent protective covering located on the nose of the fuselage 100 and one front air intake 102 is located on each side of the nose of the fuselage 100. A Canard wing 123 is attached to the front fuselage 100, with a duct 106 attached to each end of the Canard wing by a duct rotation actuator 124. Elevators 116 on trailing edge of the Canard wing facilitate in controlling the pitch of the aircraft.

Each of the ducts 106 houses a front blade actuator assembly 107 which angles a front row of blades 108 and a rear blade actuator assembly 210 which angles a rear row of counter rotating blades 109 (hidden). A duct air deflector 110 is located on the rear of each duct 106. Each of the four ducts on the aircraft contains the same front and rear blade assemblies and configuration, and each has a duct air deflector on the rear of the duct 110.

The air deflector 110 which is located on the rear of each front duct and each rear duct facilitates control of the transition from forward flight to hover and back to forward flight or from hover to forward flight and back to hover, and control of the sideways and counter rotating motion when in hover.

One front tire 103 is located on the front bottom of each side of the fuselage and is attached to a fixed front landing gear spar 105 and is covered by a streamlined fairing 104 which is wrapped around each tire. The spars are fixed, but the tires are rotatable and free turning to provide a tight turning radius. A first-avionics bay 128 for storing the aircraft's computer, gyroscopic equipment, etc. is located inside the nose cone. This bay houses the flight computers and gyroscopes which handle guidance, navigation and control; i.e., it serves as a data bus which takes the flight instrumentation, weather and additional data, along with pilot input, to control flight. A second bay is located in the back (not shown) for redundancy.

Center of the Aircraft

The main fixed dihedral wing 113 is attached to the bottom of the fuselage 100 below the passenger cabin doors 126. A speed brake 111 is located toward the center of the wing 113 on each side of the fuselage to enable the aircraft to slow while in forward flight. The wing is dihedral, and its assembly includes winglets 114 to help reduce drag and thereby increase speed and lift; ailerons 115 to help control roll while in forward flight; and flaps 112 to help: reduce landing speed, move into transitional speed while switching from horizontal to vertical and/or back to horizontal; and decrease the surface area of the wing thus resulting in less drag on vertical take-off.

Rear Section of the Aircraft

One rear tire (not shown in FIG. 1) is attached to a fixed rear landing gear spar 117 on each side of the fuselage 100 toward the aft section of the aircraft. Each of these rear tires is fixed and is covered by a streamlined fairing 104 and is equipped with brakes.

A ducted fan 106 is located on each side of the fuselage 100 with the attachment point located behind the rear passenger cabin/canopy 126.

The rear engine 202 is mounted slightly higher than the front engine 201 to provide room for air intake cooling which is accomplished through an air intake scoop 118 located behind the passenger cabin/canopy 126 and on each side of the fuselage 100.

One fixed vertical stabilizer 120 is attached on each side and at the end of the fuselage 100 to minimize or eliminate the yaw/roll oscillations and to reduce the drag off the end of the lifting body. A rudder assembly 119 attached to the rear of each vertical stabilizer 120 will help provide yaw control. Atop the vertical stabilizers 120, a horizontal stabilizer 122 is attached with a rear elevator 121 located on the trailing edge of it for pitch control.

The emergency parachute with its deployment rocket launchers is stored in a storage location compartment 125 in the rear fuselage 100, just behind the passenger cabin/canopy 126 and above the rear engine 202. The parachute cables are attached to the aircraft at four attachment points 129 (three not shown). Two of these points are located on each side of the aircraft with two fore and two aft. The front parachute cable on each side is routed from the attachment point 129 on the front of the aircraft, up the side between the front and rear canopy, across the top between the hinged gull wing doors and back to the parachute storage compartment. The rear attachment point is located behind and above the air intake scoop 118 on each side of the aircraft. The rear cable on each side is routed up the side of the aircraft from the attachment point to the storage compartment. All the routings are concealed in a recessed channel under a non protruding breakaway covering (not shown) which is aerodynamically flush with the fuselage.

FIG. 2a is a top view cross sectional schematic of the preferred embodiment. This view shows two Axial Vector/Dyna-Cam type double-ended direct driveshaft engines mounted sideways and in-line with respect to the fuselage with one fore and one aft. A first Axial Vector/Dyna-Cam type engine 201 is placed sideways in the front portion of and with respect to the fuselage 100, and a second Axial Vector/Dyna-Cam type engine 202 is placed sideways in the rear portion of and with respect to the fuselage 100. Each engine has a double-ended driveshaft 204 or 219 which powers a pair of ducted fans 106R and 106L, and 706R and 706L. One ducted fan 106R, 106L is mounted on each end of the front Canard wing 123 and one ducted fan 706R, 706L is mounted on each side of the fuselage 100 behind the passenger cabin/canopy 126.

In general, the current invention includes providing a first power generation device forward in the fuselage, and using that first power generation device to power a first drive shaft to serve a ducted fan on the right wing, and to power a second drive shaft to serve another ducted fan on the left wing. In this example, the first power generation device is a single Axial Vector engine, and the first drive shaft and the second drive shaft may be a single continuous drive shaft 226 that goes through the engine and protrudes out each end of the engine. In other embodiments described below, the first power generation device may be two or more engines in alignment, and the first and second drive shafts may be separate shafts, but may be coupled together to act as a single shaft.

Forward Engine

The front engine 201 is mounted in a sideways position with respect to the fuselage 100 between the nose of the aircraft and the front section of the cabin/canopy 127. As the double ended direct drive shaft 204 exits each end of the front engine 201 each side of the drive shaft runs in an opposite direction through a transfer case 203, down through the cord of the Canard wing 123 and into an internal duct differential 212 in the center of the ducted fans 106L and 106R. The section of the drive shaft which exits the left end of the engine runs to the left to power the left front ducted fan 106L; the section of the driveshaft which exits the right end of the engine runs to the right to power the right front ducted fan 106R.

Rear Engine

The rear engine 202 is mounted in a sideways position with respect to the fuselage 100 behind the passenger cabin/canopy 126. It is in-line with the front engine 201 and slightly elevated above the center line of the fuselage 100. Two air intake scoops 118 with one mounted on each side of the fuselage in front of the rear engine 202 provide for air cooling of the engine. The rear direct driveshaft 219 is shorter than the front driveshaft 204 because the rear ducted fans 706L and 706R. are mounted on each side of the fuselage 100 just behind the passenger cabin/canopy 126. As with the front engine, the double-ended direct driveshaft 219 exits each end of the rear engine 202 and each side of the driveshaft runs in an opposite direction through a transfer case 218 and into an internal duct differential 212 in the center of the duct.

In this embodiment, the front transfer case 203 and the rear transfer case 218 are connected by a transfer case supplemental driveshaft 217 which runs just inside of each side of the fuselage 100 between the transfer cases 203 and 218. These supplemental driveshafts are not normally engaged; however, should one engine lose power, the computer engages the driveshafts in the transfer cases thereby bypassing the non-working engine. The transfer case of the working engine provides power to turn the pair of ducted fans 106R and 106L, or 706R and 706L of the non-working engine and thus keep the aircraft in a stable position.

The mechanics inside each of the ducts 106R and 106L is identical except for the entry of the driveshaft through the duct rotator actuator 124 into the duct. The front 204 and rear 219 driveshafts extending from the right sides of the engines enter the right front and right rear ducts 205 from the left; and the front 204 and rear 219 drive shafts running from the left sides of the engines enter the left front and left rear ducts 106L and 706L from the right.

In each of the four ducts 106 a differential casing 213 houses the differential 212 and two differential output driveshafts 225. The differential 212 turns the two output driveshafts 225 in a counter rotating motion with one shaft powering a row of variable pitch blades 108 at the front low pressure air intake opening 206 and one powering another row of variable pitch blades 109 at the rear air output expansion chamber 216 of each duct 106. These blades will turn in a counter rotating motion with two computer controlled actuator assemblies—one front 107 and one rear 210—determining the pitch of the blades. As the actuator assembly increases the pitch of the blades in each of the ducts, air flow is increased through the front air intake 206, is compressed in the high pressure chamber 306, and is exhausted by the rear row of blades 109 through the expansion chamber 216. This creates the thrust for take off in either vertical or forward flight. See FIG. 3 for more precise explanation of ducts and FIG. 4 for duct rotation and how they effect take off, flight, etc.

Figure 2B:
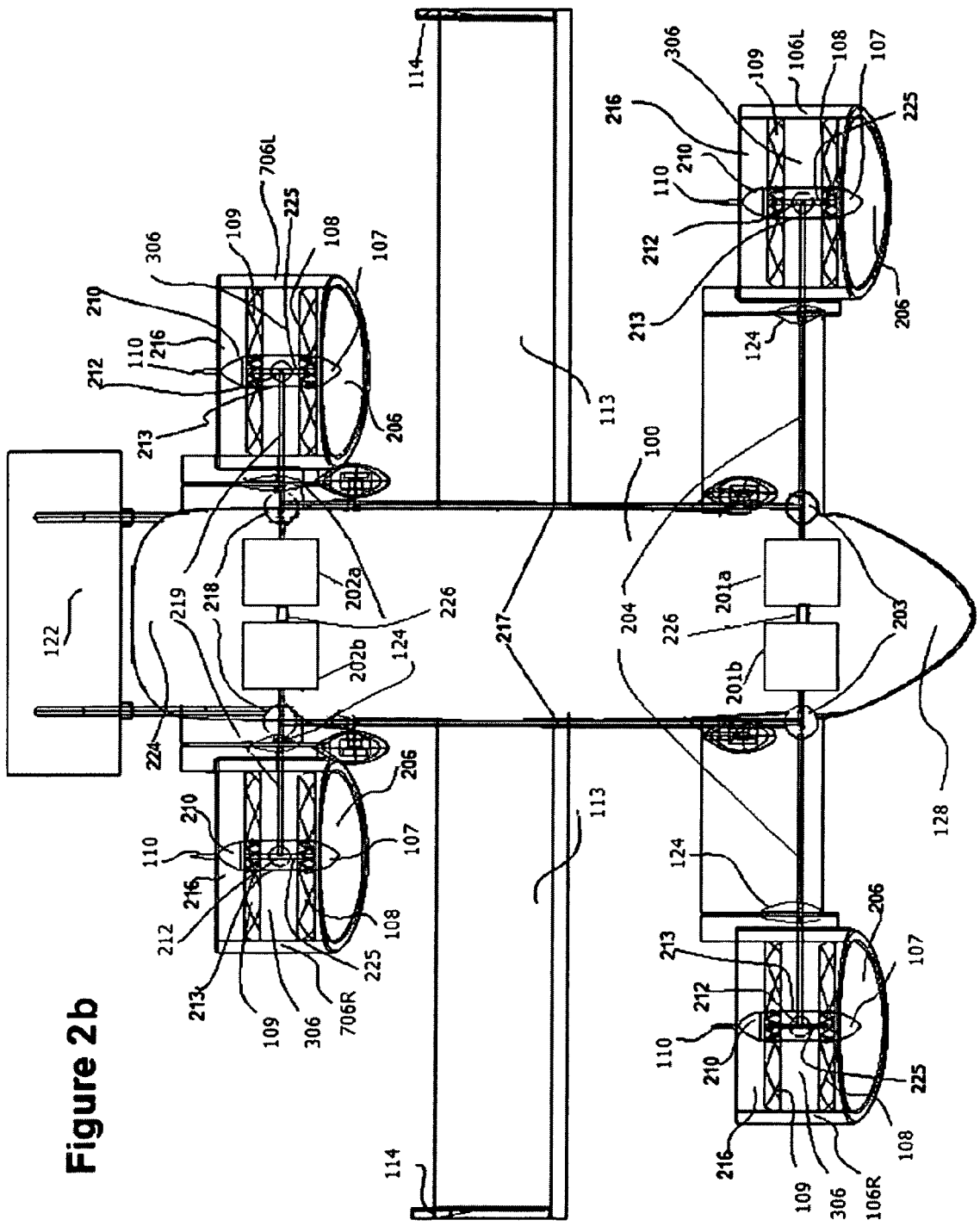
FIG. 2b is a top view of a cross section view of the aircraft of FIG. 1 showing pairs of engines serving the front and rear pairs of ducted fans.
Figure 3A:
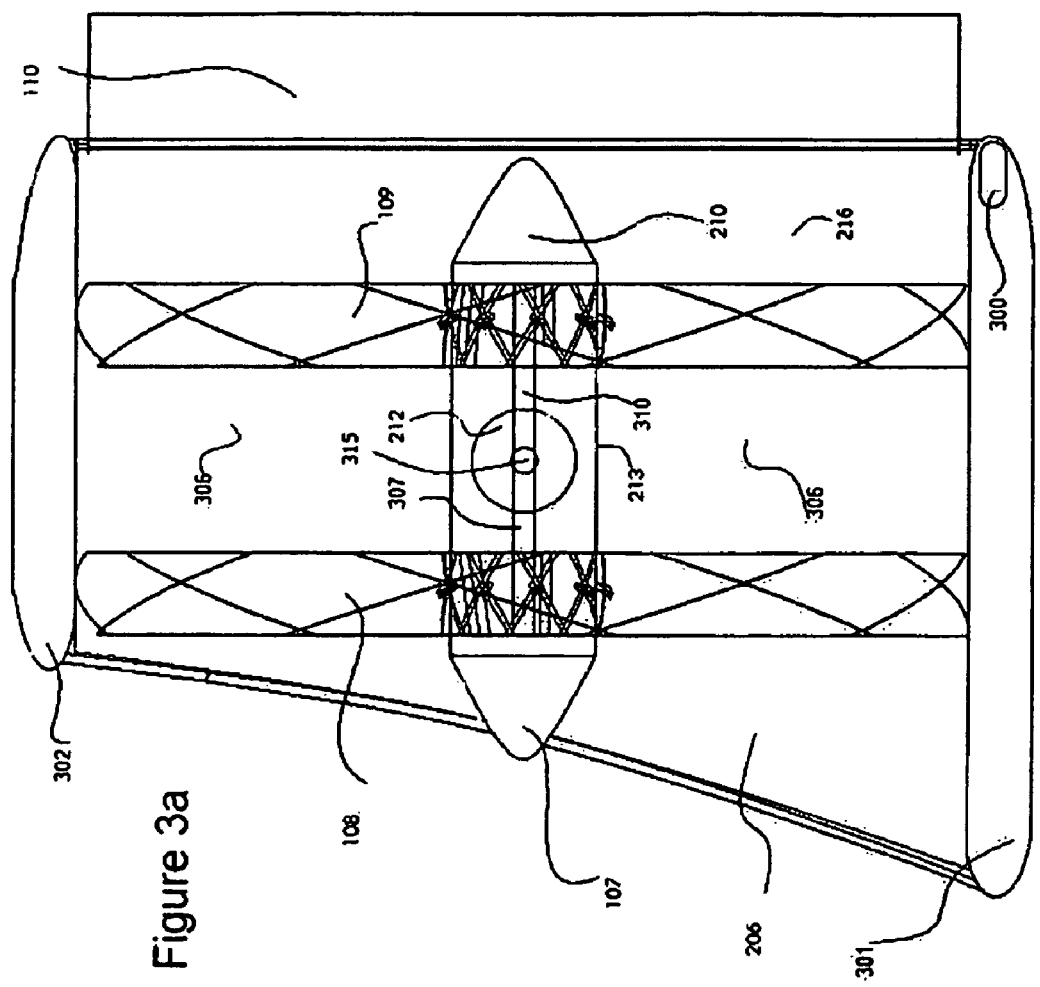
FIG. 3a is a side cross section view of a duct assembly.
Figure 3B:
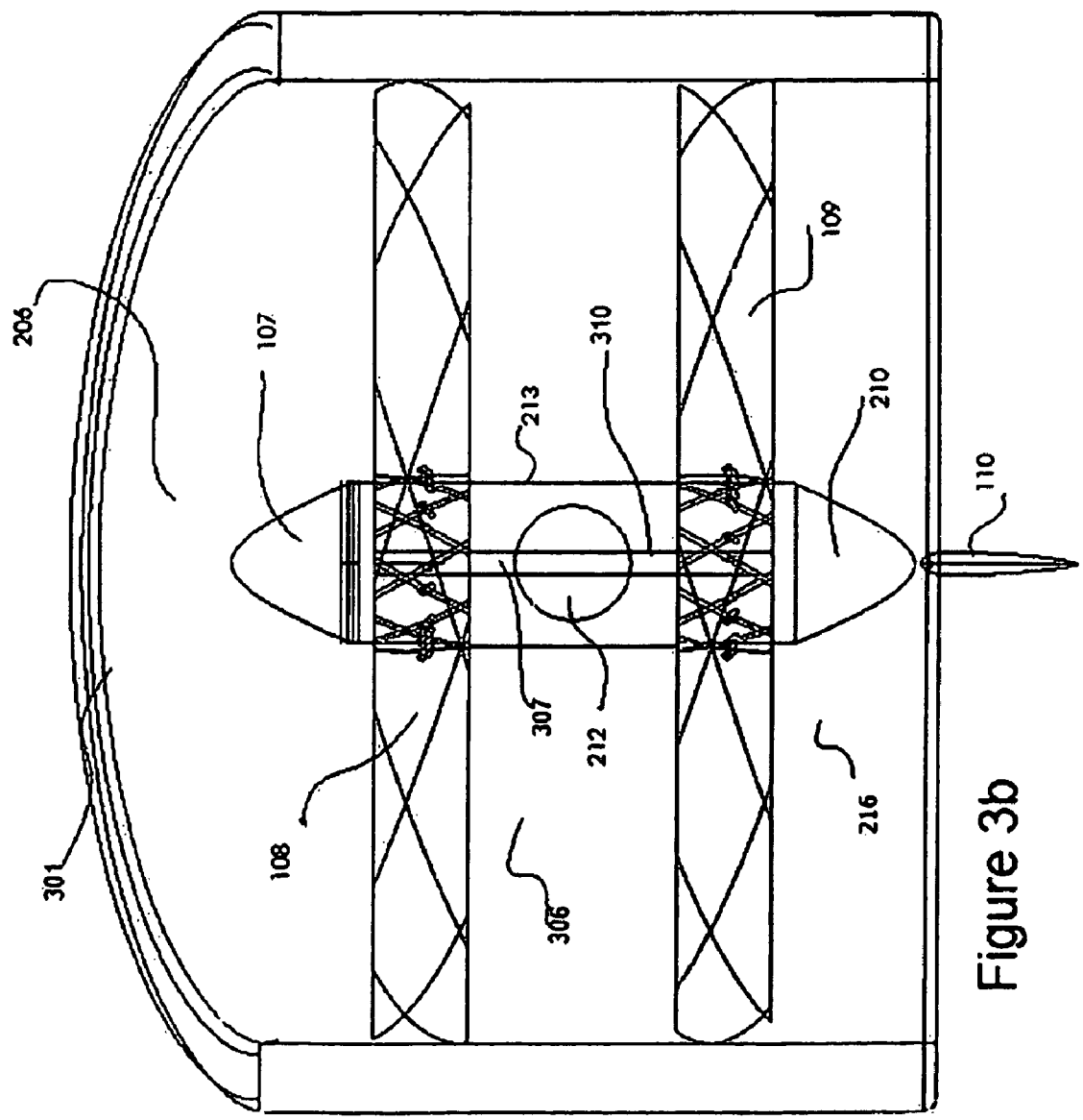
FIG. 3b is a top cross section view of the duct assembly.
Figure 3C:
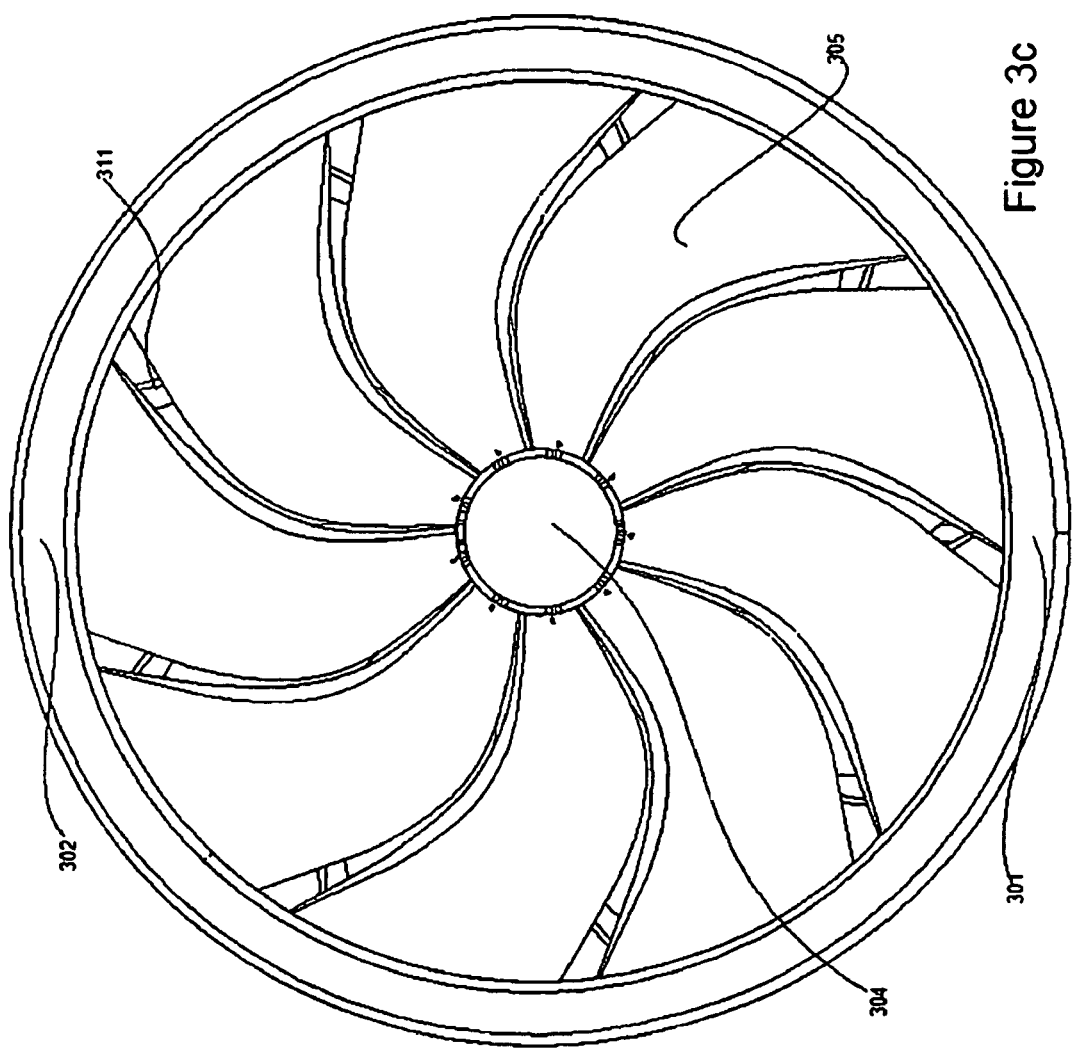
FIG. 3c is a front view of the duct assembly.

FIGS. 3a, 3b and 3c present the side, top and front views of the duct assembly. Each of these ducts is a ducted tilt rotor, composed of a lightweight composite material. The rows of blades inside the ducts are driven by a direct driveshaft 315 from a double-ended engine which is mounted sideways with respect to the aircraft fuselage. Driveshaft 315 may be located in either the front of the aircraft as shown by element 204 in FIG. 2, or in the rear of the aircraft as shown by element 219. The driveshaft 315 will enter each duct from the side and connect inside the differential casing 213 with the differential 212 in the center of the duct. At that point, two output shafts 307 in each of the front ducts and two output shafts 310 in each of the aft ducts from the differential 212 will drive both a row of fan blades 108 in front of each duct and another row of blades 109 in the rear of each duct. The row of blades will turn in a counter rotating motion which creates more thrust and reduces the overall diameter of the ducts, thereby giving clearance for conventional aircraft take-off and landing mode as well as VTOL capability.

FIG. 3a and FIG. 3b illustrate the aerodynamic shape of the front of each of the ducts, with the bottom of each duct protruding forward as a front induction scoop 301 and with the top of each duct sloping down from an upper front induction scoop 302 to the front induction scoop 301, thereby creating less drag. This lifting air intake duct design creates a low pressure area 206 in the bottom front of the duct which in turn creates lift. This eliminates the need for more wing area and in turn reduces the weight of the aircraft.

FIG. 3a also shows the high pressure inner compression chamber 306 located between the two rotating rows of blades—front 108 and rear 109—in each duct. The front blade actuator 107 changes the pitch of the front blades. By increasing the pitch of the front row of blades 108 the air is pulled in and compressed in the high pressure inner compression chamber 306. The rear blade actuator 210 changes the pitch of the rear row of blades 109. The rear blades pull the air from the compressed air chamber and exhaust the air through the low pressure expansion chamber 216 thereby creating forward thrust.

The blades in each row have variable pitch controlled by fly-by-wire computers which relay information to the front blade actuator 107 and to the rear blade actuator 210 to adjust the angle of the blades. Gyros located in the avionics bays send a computer signal to the blade actuators to help control the stability in hover. The blades are capable of self feathering and lining up in an identical configuration behind one another within each duct to help reduce drag and to increase air flow through the ducts should an engine be lost or shut down. This extends the range which can be flown with one engine.

Each duct will also have a rear air deflector 110 mounted vertically on the rear of the duct when positioned for forward flight. This deflector 110 is controlled by a fly-by-wire actuator 300 and can divert air to either the left or the right to help stabilize the aircraft when it transitions from flight to hover. While in hover mode, the deflector 110 diverts the air to provide the ducts with the capability of moving the aircraft sideways. Additionally, the air deflector 110 on the rear of the front duct can move one way while the air deflector 110 on the back of the rear duct diverts in the opposite direction, thus giving the aircraft counter-rotation capabilities.

Figure 4A:
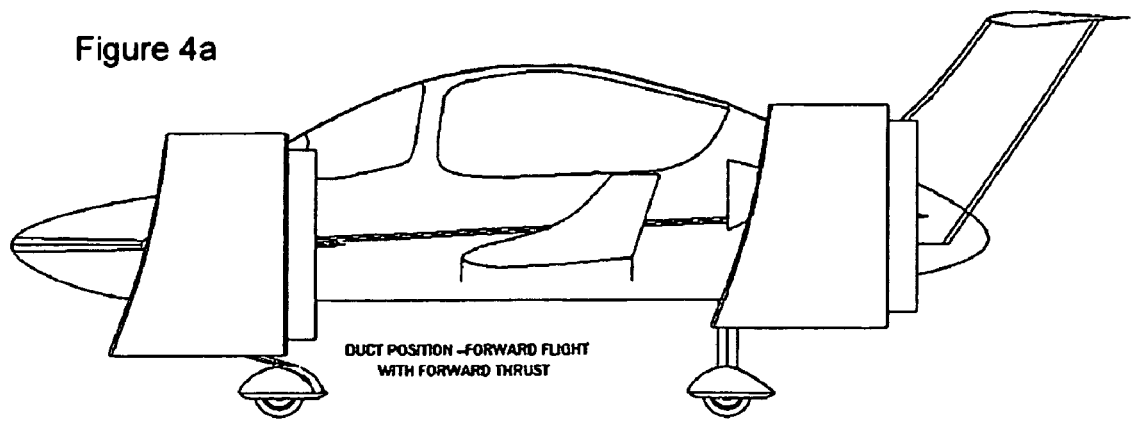
FIG. 4a is a side view of the aircraft of FIG. 1 in forward flight with rear thrust.
Figure 4B:
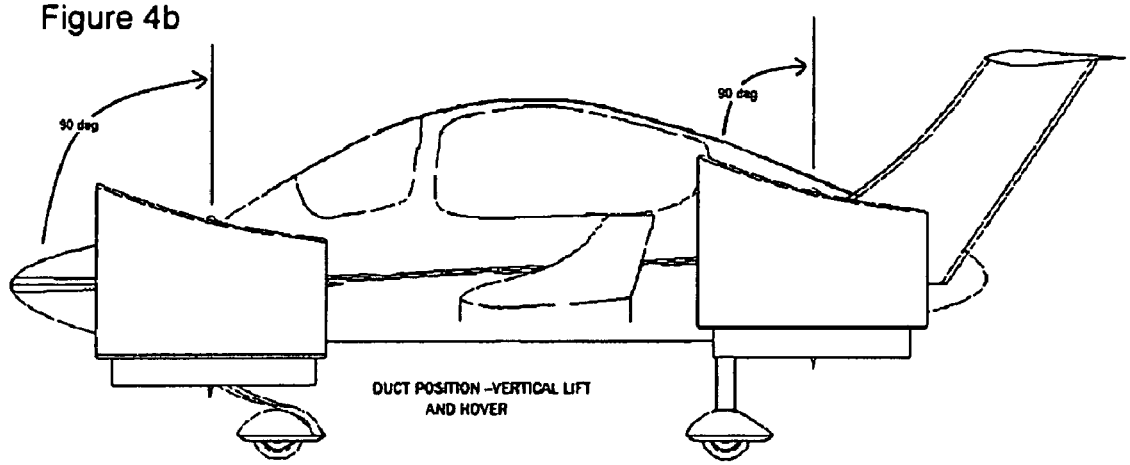
FIG. 4b is a side view of the aircraft of FIG. 1 in hover with downward thrust.
Figure 4C:
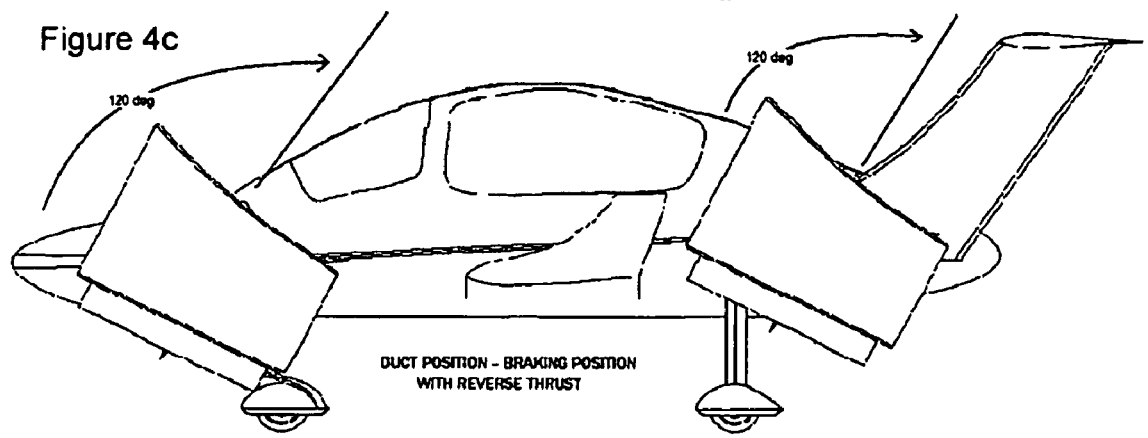
FIG. 4c is a side view of the aircraft of FIG. 1 in braking position with reverse thrust.

FIGS. 4a, 4b and 4c show the position of the ducts in forward flight, hover and reverse, respectively.

FIG. 4a shows the position of the ducts for forward flight and for take-off in conventional fixed wing mode.

FIG. 4b illustrates the position of the ducts in hover and for vertical take-off. As the aircraft is lifting vertically as shown in FIG. 4b, forward movement is accomplished by a computer controlled duct rotator actuator 124 rotating the ducts forward FIG. 4a to create forward movement until such speed is reached that sufficient airflow over the lifting surfaces creates lift, and the aircraft transitions from vertical to horizontal flight.

While in forward flight FIG. 4a, the ducts 106 remain in aerodynamic alignment with the fuselage 100 as with a conventional aircraft. When transitioning from horizontal flight to vertical, the duct actuators 124 are rotated upward to slow the forward motion FIG. 4b. This decreases the air speed thus reducing the airflow over the lifting surfaces, and as the duct 106 is rotated back to the upward position, it increases the vertical thrust of the variable pitch blades. The actuators 124 can turn the ducts past vertical FIG. 4c to slow the aircraft to a complete stop of forward motion. The tilted duct rotator actuator 124 also controls forward and reverse in hover by moving the ducts 106 forward or backward, respectively.

DESCRIPTION OF EMBODIMENT

UAV

In this embodiment, the aircraft is adapted to perform as an unmanned aerial vehicle or UAV. This embodiment includes the sideways engine placement and in-line alignment and the fans encased in ducts of previous examples. Most of the configuration of the preferred embodiment would remain intact, but differences primarily occur to help reduce the radar signature and to help provide for the carrying on weapons, large payloads, surveillance equipment, etc. The aircraft and the engine could be scaled up or scaled down to accommodate differences required for weight and/or missions.

Figure 5:
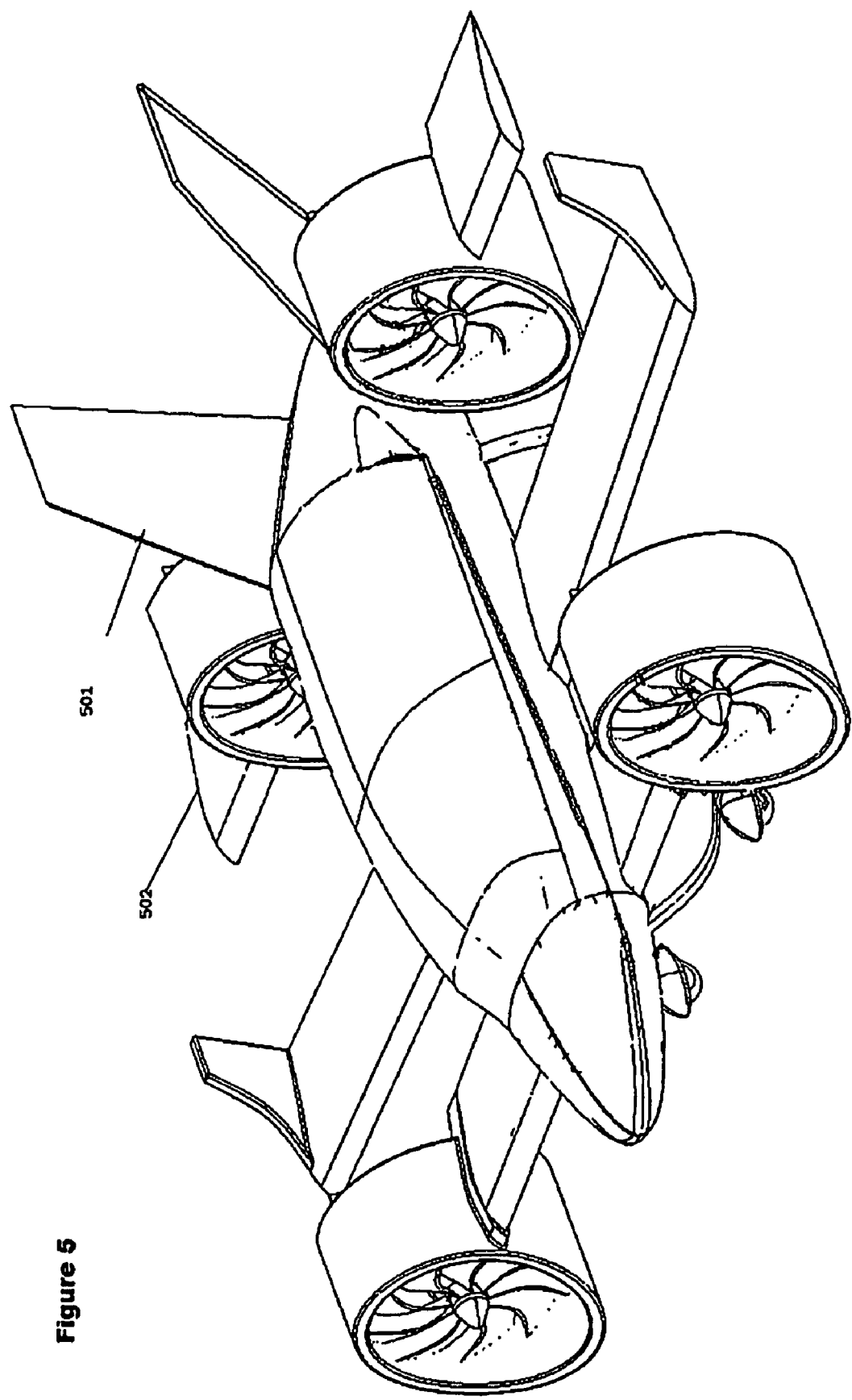
FIG. 5 is a front perspective view of a Personal Air Vehicle (PAV) or an Unmanned Aerial Vehicle (UAV) embodiment.

The embodiment could include the same tail configuration of the other examples; i.e, the vertical stabilizers with the horizontal tail atop them, or as pictured in FIG. 5, it could utilize a V-tail assembly 501 and include horizontal stabilizers 502 attached to the sides of and/or to the rear of the ducts (not shown). This V-tail configuration is similar to that of the Raptor F-22.

Other differences include a retractable gear instead of a fixed gear, foldable wings or changeable wings for high altitude and other applications, a large compartment in place of a passenger cabin, and a camera location in the nose cone for surveillance. The cabin canopy would be manufactured of a composite rather than a transparent material and could become more aerodynamically streamlined by incorporating a lower profile. Bomb bay doors which open at the bottom of the craft for deployment of weapons, emergency food supplies, etc. improve stealth capabilities because those items are hidden and encased rather than placed on the wings.

The UAV may be used for military and reconnaissance operations for close in support. The UAV may also be used as an emergency vehicle to pick-up wounded or stranded people in a dangerous location. The bolt-on or foldable wings allow it to be trailered to a nearby or safe location before being sent on a mission. Thinner and longer wing extensions could accommodate higher altitudes and longer loitering. The ability of the aircraft to fly with one engine shut down and to take-off and land in close proximity to a target area increases the distance the aircraft can fly on its designated fuel allowance. The engine has the ability to alternate piston firings which also increases fuel economy while keeping the aircraft aloft using very little horsepower.

Since the blades are encased in ducts, and since ducted fans are quieter than propellers or jet engines, less radar signature is produced. Also, since the engines are mounted in the fuselage, less infrared signature is produced. Stealth is therefore much improved All the cabin area between the two engines can be used for storage of weapons, cargo and supplies, and/or surveillance equipment. VTOL capabilities allow the craft to get closer to a target or to get into tight areas as for a rescue. The ability to take off and land in conventional mode provides for more carrying capacity because the wings are used for lift so the aircraft can carry more fuel and weight. Once the fuel has burned off on a long flight, a vertical landing is possible.

The V-tail configuration 501 could also be utilized on the passenger embodiment to improve the speed of the aircraft.

DESCRIPTION OF EMBODIMENT

Sport Plane

Figure 6:
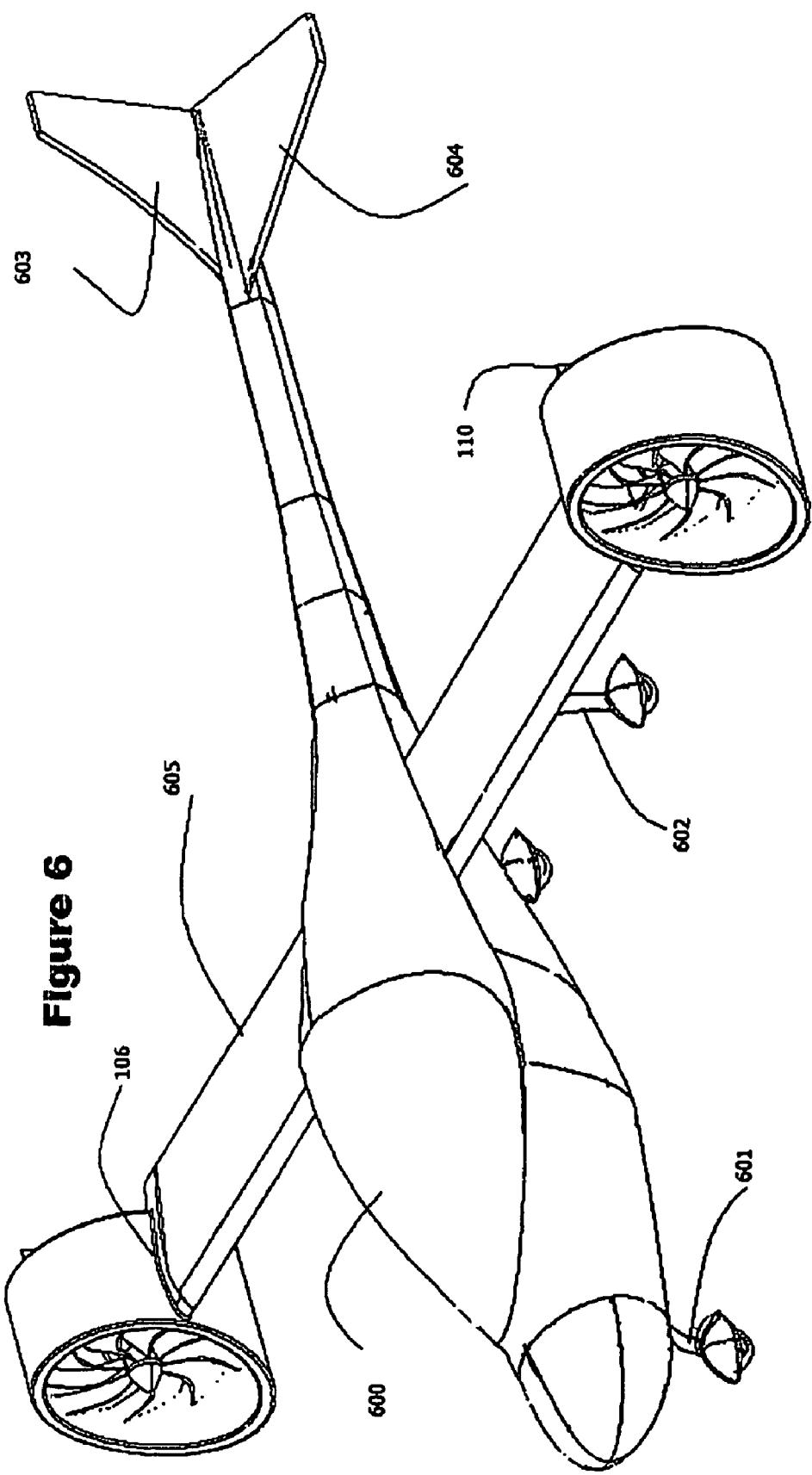
FIG. 6 is a front perspective view of a Sport Plane embodiment.

FIG. 6 shows an example of this invention as a VTOL sport plane. This embodiment is comprised of an elongated aerodynamic fuselage with one double-ended driveshaft engine mounted sideways with respect to the fuselage and with a rotatable ducted fan 106 on each end of a main fixed wing 605 for a total of two ducted fans. The passenger compartment/cabin 600 in the front portion of the fuselage can accommodate one and/or two people, and the engine is located just behind this cabin. The emergency parachute compartment is located behind the passenger cabin and just above the engine. The aircraft uses a fixed tricycle landing gear with one attached to the front 601 of the fuselage and two 602—one left and one right—attached to the bottom of the fuselage behind and below the passenger compartment.

In this instance, the double-ended driveshaft from each end of the engine will run inside one side of the dihedralles main fixed wing 605 through the duct rotator actuator, through the side of duct and into the middle of the duct where it connects to the differential. As the driveshaft exits the right end of the engine, it runs through the right side of the wing and enters the right duct through the left side; and as the driveshaft exits the left end of the engine, it runs through the left side of the wing and enters the left duct through the right side. Inside each duct, the differential has two output shafts with each one turning one row of blades. Therefore, the two output shafts turn two rows of counter rotating blades in each duct.

Two air deflectors—one vertical 110 and one horizontal (not shown in FIG. 6)—are attached to the rear of each duct. These deflectors employ the DSS (Duct Stabilization System) and use splitting capabilities to control the output thrust for increased stability. The horizontal air deflector moves the aircraft forward and backward, and provides counter rotation of the aircraft in hover. The vertical air deflector moves the aircraft sideways in hover. In conventional airplane mode, the horizontal air deflector controls the roll.

The rear fuselage of the aircraft is long and streamlined with a cruciform shaped tail comprised of one left 604 and one right (not shown) horizontal surface and one top 603 and one bottom vertical surface (not shown) controlling pitch and yaw, respectively, while the aircraft is in conventional airplane mode.

DESCRIPTION OF EMBODIMENT

Conventional Engines Placed End to End

In this embodiment, as shown in FIG. 2b, two or more engines are provided fore, and two or more engines are provided aft. Each set of engines are placed end to end and sideways with respect to the fuselage. A common drive shaft or coupled drive shafts which act as one drive shaft 226 run through the multiple engine blocks, with the shaft output on the outside ends of the outside engines running a pair of propellers or ducted fan blades. In this example, no transfer case is necessary for a backup for a dead engine. The dead engine shaft is then driven by the running engine and/or engines with the dead engine free wheeling. The propellers or ducted fan blades keep turning but at reduced power.

Another embodiment envisions two engines fore and two engines aft with each pair of engines comprising a first engine fore and a next engine aft. Each pair of engines is placed end to end and in-line and sideways with respect to the fuselage. Each engine is controlled separately with the drive shaft from the right engine turning the propellers or ducted fan blades in the right duct and with the drive shaft from the left engine turning the propellers or ducted fan blades in the left ducts. Transfer cases would be used in this example to pick up the power from the other engines.

DESCRIPTION OF EMBODIMENT

Emergency Rescue Vehicle

This embodiment uses modifications to provide for an emergency rescue vehicle.

The changes comprise shortened wings, a stubby nose, a front canopy that would fold or retract backwards, and a platform addition which would facilitate emergency escapes. The emergency vehicle could nose in to a building, cliff, etc. to provide an escape route for people trapped in, for example, a burning building. Ducted fans—as opposed to propellers—permit the craft to get next to structures or into tight areas. The stubby nose and retractable canopy allow access to the aircraft. An extendible/retractable ramp in the nose section provides a stable emergency escape route.

Different embodiments of this aircraft may utilize various engines including Axial Vector, Dyna-Cam type engines, internal combustion, radial, piston, reciprocating, rotary, rotor, StarRotor, vane, mill, electric, or similar type engines mounted in-line and sideways with respect to the fuselage.

In one embodiment, the front ducts are mounted at the end of the Canard wing, and the rear ducts are mounted on each side of the fuselage just behind the passenger canopy. However, in other embodiments, the ducts could be mounted on each side of the front part of the fuselage, on each end of the main wing, and/or on the tail, depending upon the configuration of the aircraft.

In another embodiment, propellers could be utilized to handle larger loads with less horsepower, and the engines would be mounted in a higher position on the fuselage to provide clearance for the propellers. This would accommodate from six to ten passengers or a large payload.

Each of the embodiments contemplates utilizing an emergency parachute system. The invention is equipped with a parafoil type parachute and two (2) solid fuel deployment rockets for emergencies. The parachute would primarily be used while in hover mode or at slow speeds. The parachute and the two rockets are mounted in the top of the rear portion of the fuselage behind the rear cabin with one rocket on each side. A cable system is imbedded in the fuselage with a breakaway covering. The supporting cables are attached to the airframe at four attachment points—two in the front fuselage near the outside end of the front engine and two in the rear fuselage near the outside end of the rear engine. The risers from the parachute are attached to the supporting cables.

The emergency parachute is deployed by the pilot via an emergency hand lever if the aircraft is in forward flight, or it is automatically deployed by a computer if an engine loses power or the aircraft becomes unstable in hover. The parachute system deploys the rockets, shooting them out at an angle and pulling the ends of the parafoil parachute in opposite directions, thereby moving the parachute away from the aircraft appendages and stretching the canopy to the full length of the parachute.

Airbag technology with small elongated tubes embedded in the parachute canopy cords and the outer edges of the parachute system is utilized to immediately expand it into the ultimate shape of a fully deployed parachute. The canopy will then be ready to receive the air, and this would result in the aircraft suffering a very slight loss of altitude from the time the parachute deploys until it is filled with air.

If the aircraft is moving in forward flight, computer controlled air sensors determine if a need exists to apply or delay deployment of the airbag expander of the air canopy. This would minimize the shock from the forward air speed. When the parachute is opened, it can be steered via controls inside the aircraft. The parafoil parachute gives the aircraft a forward motion to help steer the craft to a safe area for a landing while descending under the parachute. If one engine is still operating, the parachute can act as a parasail to help keep the aircraft aloft while the pilot leaves a dangerous area and searches for a safe landing site.

Since the emergency parachute is computer controlled in hover, it is possible the emergency backup transfer case and transfer driveshafts could be bypassed and eliminated from certain embodiments thereby streamlining and simplifying the design of the output shafts from the engine to each differential. This would significantly reduce the weight of the aircraft.

The embodiments described above are some examples of the current invention. Various modifications, applications and changes of the current invention will be apparent to those skilled in the art. The scope of the invention is defined by the claims, and is not limited to the specific examples described.

What is claimed is:

1. An aircraft comprising:
   a fuselage having a longitudinal axis, a front portion, a middle portion, and a rear portion;
   a canard wing extending from said front portion of said fuselage, said canard wing having a left end and a right end;
   a main wing extending from said middle portion of said fuselage;
   a tail section extending from said rear portion of said fuselage;

a first propeller rotatably mounted to said left end of said canard wing;

a second propeller rotatably mounted to said right end of said canard wing;

a third propeller rotatably mounted on a left side of said rear portion of said fuselage;

a fourth propeller rotatably mounted on a right side of said rear portion of said fuselage;

said first and second propellers being mounted further from said longitudinal axis than said third and fourth propellers;

a first engine disposed in said front portion of said fuselage, said first engine comprising a first double-ended driveshaft having a first axis of rotation oriented transverse to said longitudinal axis of said fuselage, said first double-ended driveshaft comprising a continuous driveshaft extending from said first propeller to said second propeller; and a second engine disposed in said rear portion of said fuselage, said second engine comprising a second double-ended driveshaft having a second axis of rotation oriented transverse to said longitudinal axis of said fuselage, said second double-ended driveshaft comprising a continuous driveshaft extending from said third propeller to said fourth propeller.

2. The aircraft of claim 1 wherein each of said first, second, third, and fourth propellers comprises a ducted fan.

3. The aircraft of claim 2 wherein each of said ducted fans comprises a differential operably connected to two rows of counter-rotating blades.

4. The aircraft of claim 2 wherein each of said ducted fans comprises an aerodynamic shape wherein a bottom portion protrudes forward of a top portion, and wherein said top portion and said bottom portion are connected by a sloped portion.

5. The aircraft of claim 1 wherein said tail section comprises two vertical stabilizers and a horizontal stabilizer disposed across a top portion of said vertical stabilizers.

6. The aircraft of claim 1 wherein said tail section comprises a V-tail.

7. The aircraft of claim 1 wherein said first double-ended driveshaft traverses through a first transfer case and said second double-ended driveshaft traverses through a second transfer case, and wherein said first and second transfer cases are connected by a transfer case supplemental driveshaft which is engageable with said first and second transfer cases if one of said first and second engines loses power.

8. The aircraft of claim 1 further comprising a rocket-launchable parachute disposed in a parachute storage compartment in an upper region of said rear portion of said fuselage, said parachute being attached to said fuselage with cables at four attachment points, two of said attachment points being on said front portion of said fuselage and two of said attachment points being on said rear portion of said fuselage, said cables being concealed in recessed channels under a non-protruding breakaway covering which is aerodynamically flush with said fuselage.

9. The aircraft of claim 1 wherein at least one of said first and second engines comprises a plurality of engines respectively connected to one of said double-ended driveshafts.

10. An aircraft comprising:
a fuselage having a longitudinal axis, a front portion, a middle portion, and a rear portion;

a canard wing extending from said front portion of said fuselage, said canard wing having a left end and a right end;

a main wing extending from said middle portion of said fuselage, said main wing having no engine or propeller attached thereto;

a tail section extending from said rear portion of said fuselage;

a first propeller rotatably mounted to said left end of said canard wing;

a second propeller rotatably mounted to said right end of said canard wing;

a third propeller rotatably mounted on a left side of said rear portion of said fuselage;

a fourth propeller rotatably mounted on a right side of said rear portion of said fuselage;

a first engine disposed in said front portion of said fuselage, said first engine comprising a first driveshaft operably connected between said first propeller and said second propeller; and a second engine disposed in said rear portion of said fuselage, said second engine comprising a second driveshaft operably connected between said third propeller and said fourth propeller.

11. The aircraft of claim 10 wherein each of said first, second, third, and fourth propellers comprises a ducted fan.

12. The aircraft of claim 10 wherein said first driveshaft comprises a single driveshaft extending from said first propeller to said second propeller.

13. The aircraft of claim 10 wherein said second driveshaft comprises a single driveshaft extending from said third propeller to said fourth propeller.

14. The aircraft of claim 10 wherein said first engine comprises a plurality of engines connected to said first driveshaft.

15. The aircraft of claim 10 wherein said second engine comprises a plurality of engines connected to said second driveshaft.

* * * * *